(12) United States Patent
Gu

(10) Patent No.: US 8,931,795 B1
(45) Date of Patent: Jan. 13, 2015

(54) QUICK RELEASE ATTACHMENT FOR A BICYCLE

(71) Applicant: Tien Hsin Industries Co., Ltd., Taichung (TW)

(72) Inventor: Black Gu, Taichung (TW)

(73) Assignee: Tien Hsin Industries Co., Ltd., Taichung (TW)

( * ) Notice: Subject to any disclaimer, the term of this patent is extended or adjusted under 35 U.S.C. 154(b) by 0 days.

(21) Appl. No.: 14/071,809

(22) Filed: Nov. 5, 2013

(51) Int. Cl.
*B62J 11/00* (2006.01)
*B62J 1/08* (2006.01)
*B60R 11/00* (2006.01)

(52) U.S. Cl.
CPC .......... *B60R 11/00* (2013.01); *B60R 2011/0042* (2013.01)
USPC .......... 280/288.4; 280/769; 224/420; 224/427

(58) Field of Classification Search
CPC ............... B62J 1/08; B62J 7/00; B62J 9/00; B62J 11/00; B62J 2099/0006; B62J 2099/0013; B62J 2099/0026; B62J 2099/0033; B62J 2099/0093; B60R 11/00; B60R 2011/00; B60R 2011/0042; B60R 2011/0059; B60R 2011/0078; B60R 2011/008
USPC .............. 280/769, 288.4, 304.5, 33.992, 727; 224/412, 419, 420, 421, 425, 426, 427, 224/441, 442, 447, 448, 451, 452, 454
See application file for complete search history.

(56) References Cited

U.S. PATENT DOCUMENTS

| | | | |
|---|---|---|---|
| 6,557,808 B1 * | 5/2003 | Ling | 248/229.1 |
| 7,503,573 B2 * | 3/2009 | Finlaw et al. | 280/202 |
| 7,654,550 B2 * | 2/2010 | Chuang | 280/288.4 |
| 8,348,296 B2 * | 1/2013 | Taiga | 280/288.4 |

* cited by examiner

*Primary Examiner* — John Walters
(74) *Attorney, Agent, or Firm* — Rosenberg, Klein & Lee

(57) ABSTRACT

A quick release attachment for a bicycle includes an attachment device, a bracket and a quick release assembly. The attachment device has a main connecting body. The main connecting body has a retaining groove. The bracket has a sub connecting body. The bracket has a connecting portion defined at one lateral side thereof. The connecting portion has an opening defined therethrough. The quick release assembly has a quick release member and an abutting block. The quick release member is assembled with the connecting portion and defines a tightening position and a releasing position. The abutting block is received in the opening of the bracket. When the pivot portion is on the tightening position, the abutting block is engaged with the retaining groove of the main connecting body so that the attachment device is secured to the bracket.

10 Claims, 11 Drawing Sheets

QUICK RELEASE ATTACHMENT FOR A BICYCLE

BACKGROUND OF THE INVENTION

1. Field of the Invention

The present invention relates to a quick release device, and more particularly to a quick release attachment for a bicycle.

2. Description of Related Art

Bicycle activity is more and more popular in these days because it is eco-friendly, convenient and entertaining. In general, most people would like to assemble other bicycle attachments on a bicycle, such as bicycle lamp, speedometers, etc. Furthermore, when the bicycle is parked outside over long period of time, a bicycle saddle is deteriorated easily. Also, when a user wants to exchange a personal saddle to use as the bicycle is public, it is inconvenient for the user to detach the bicycle saddle or other attachment from the bicycle. Therefore, a quick release attachment for a bicycle is convenient for the user to use.

A conventional quick release device for a bicycle comprises a bracket and an attachment device. The bracket has a first connecting structure and a fixing hole connected with a handlebar. The attachment device has a second connecting structure corresponding to the first connecting structure of the bracket. Specifically, the first connecting structure has two engaging ribs and an elasticity fastener defined on the bracket. The second connecting structure has two grooves corresponding to the two engaging ribs of the first connecting structure. The two grooves of the second connecting structure are slid into the two engaging ribs of the first connecting structure, so that the attachment device could be positioned on the bracket and secured by the elasticity fastener.

Another conventional quick release device for a bicycle comprises a first connecting member and a second connecting member. The first connecting member has a positioning portion defined at one end thereof and a female buckle extended from the positioning portion downwardly. The second connecting member has a connecting portion defined at one end thereof and a male buckle corresponding to the female buckle of the first connecting member. The connecting portion of the second connecting member is assembled with an attachment and the positioning portion of the first connecting member is assembled with a bicycle saddle. The male buckle of the second connecting member is coupled with the female buckle of the first connecting member, so that the attachment could be attached to the saddle conveniently.

However, the above two conventional quick release devices have two disadvantages as following:

1. The engaging mechanism of two conventional quick release devices is deficient so that the attachment will be dropped out easily.

2. The two conventional quick release devices are inconvenient for the user to use.

The present invention has arisen to mitigate and/or obviate the disadvantages of the conventional quick release device for a bicycle.

SUMMARY OF THE INVENTION

The main objective of the present invention is to provide an improved quick release device for a bicycle.

To achieve the objective, a quick release attachment for a bicycle comprises an attachment device having a main connecting body defined at a lower portion thereof, the main connecting body having a retaining groove defined at one lateral sided thereof, a bracket assembled on a bicycle, the bracket having a sub connecting body corresponding to the main connecting body, the bracket having a connecting portion defined at one lateral side thereof, the connecting portion of the bracket having an opening defined therethrough and communicating with the retaining groove of the main connecting body, a quick release assembly having a quick release member and an abutting block, the quick release member having a pivot portion and a grip portion, the pivot portion assembled with the connecting portion of the bracket pivotally, the pivot portion defining a tightening position and a releasing position, the pivot portion pivoted between the tightening position and the releasing position via the grip portion, the abutting block received in the opening of the bracket, the abutting block having a first abutting end and a second abutting end defined at two ends thereof respectively, the first abutting end abutting against the pivot portion, the second abutting end inserted into the opening of the bracket, the pivot portion defining an axis at a center thereof.

Wherein, the connecting portion of the bracket further has two convex ears, the two convex ears having two through holes defined therethrough respectively, the opening disposed between the two convex ears of the connecting portion, the pivot portion of the quick release member assembled between the two convex ears; the pivot portion of the quick release member has a pivot hole defined therethrough. The quick release assembly has an adjusting assembly, the adjusting assembly having a first adjusting member and a second adjusting member, the first adjusting member having a first head and a first shank, the second adjusting member having a second head and a second shank; the first shank and the second shank both have an enlarging section and a narrow section; the enlarging section of the first shank is adjacent to the first head, and the narrow section of the first shank is adjacent to the enlarging section; the enlarging section of the second shank is adjacent to the second head, and the narrow section of the second shank is adjacent to the enlarging section. The first adjusting member and the second adjusting member both have an inclined surface defined between the enlarging section and the narrow section; the inclined surfaces of the first adjusting member and the second adjusting member are respectively abutted against two sides of the pivot hole. The first shank of the first adjusting member and the second shank of the second adjusting member respectively pass through the two through holes of the two convex ears and are inserted into the pivot hole of the quick release member; the first adjusting member and the second adjusting member are coupled with each other, wherein the narrow sections are disposed in the pivot hole of the quick release member and the enlarging sections are disposed out of the pivot hole; when the first adjusting member and the second adjusting member are adjusted toward each other, the enlarging sections of the first adjusting member and the second adjusting member compress an inner wall of the pivot hole of the quick release member so as to press the pivot portion to abut against the first abutting end of the abutting block. Furthermore, the opening of the bracket has a first opening and a second opening defined in a bottom of the first opening and communicating with the first opening; the first opening is larger than the second opening to form a shoulder between the openings; the second abutting end of the abutting block passes through the second opening; the first abutting end of the abutting block is received in the first opening and abuts against the shoulder. The first shank of the first adjusting member has an external thread section defined at one end thereof; the second shank of the second adjusting member has an internal thread section defined in an inner periphery thereof; the external thread section of the first adjusting member corresponds to the internal thread section of the second adjusting member; the external thread section of the first adjusting member is screwed into the internal thread section of the second adjusting member. The sub connecting body has a positioning groove defined therein; the main connecting body is slid into the positioning groove of the sub connecting body and positioned in the positioning groove. The attachment device has a cover member and an assembling base; the main connecting body is disposed under the assembling base and the cover member is assembled on a top side of the assembling base; the assembling base has two clamping grooves defined at the top side thereof; the cover member has another two clamping grooves defined at one side thereof and corresponding to the two clamping grooves of the assembling base. The attachment device has a threaded hole defined therethrough; a screw member passes through the threaded hole of the attachment device from the connecting body to the cover member and secured; a bicycle attachment is assembled on a terminal end of the crew member.

When the pivot portion is on the tightening position, a distance between the axis and the first abutting end of the abutting block is larger than another distance between the axis and the first abutting end of the abutting block as the pivot portion is on the releasing position.

Further benefits and advantages of the present invention will become apparent after a careful reading of the detailed description with appropriate reference to the accompanying drawings.

DETAILED DESCRIPTION OF THE INVENTION

Figure 1:
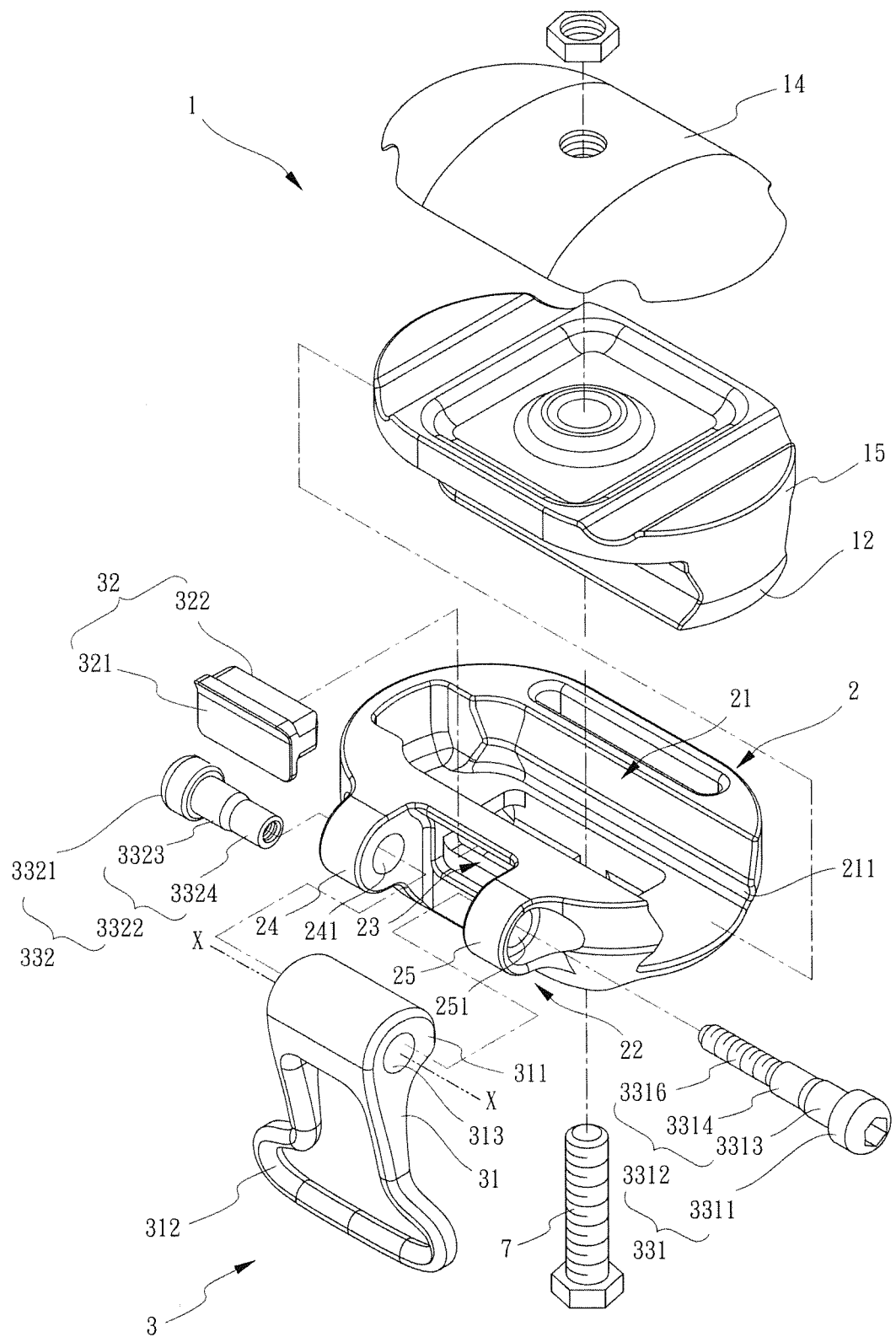
FIG. 1 is an exploded perspective view of a quick release attachment for a bicycle of the present invention.
Figure 2:
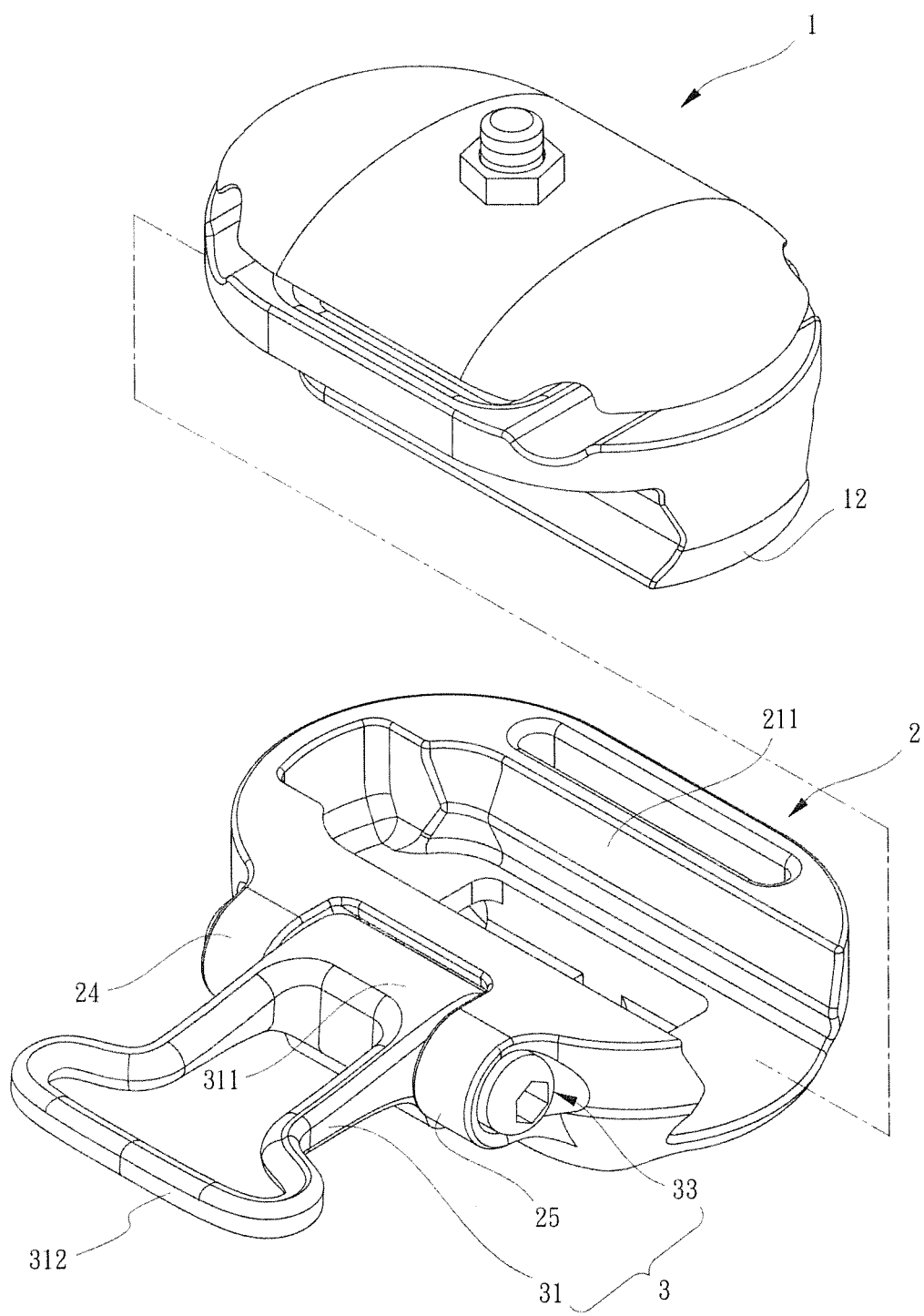
FIG. 2 is a perspective view of the quick release attachment for a bicycle wherein an attachment device is detached from a bracket 2.
Figure 3:
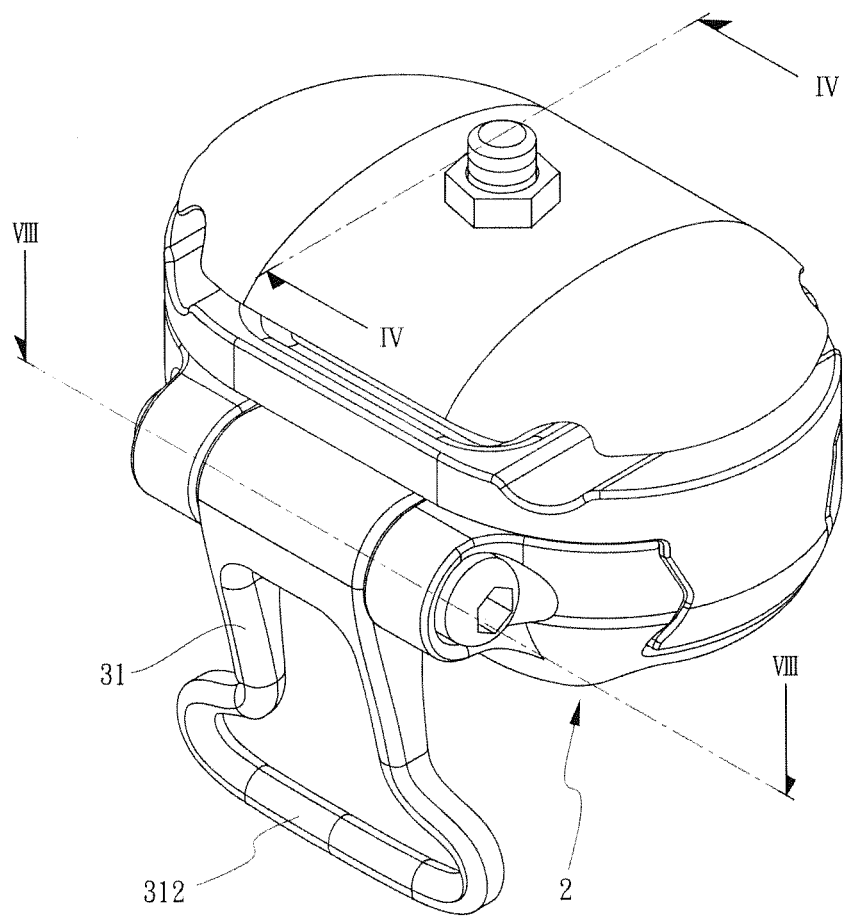
FIG. 3 is a perspective view of the quick release attachment for a bicycle.
Figure 4:
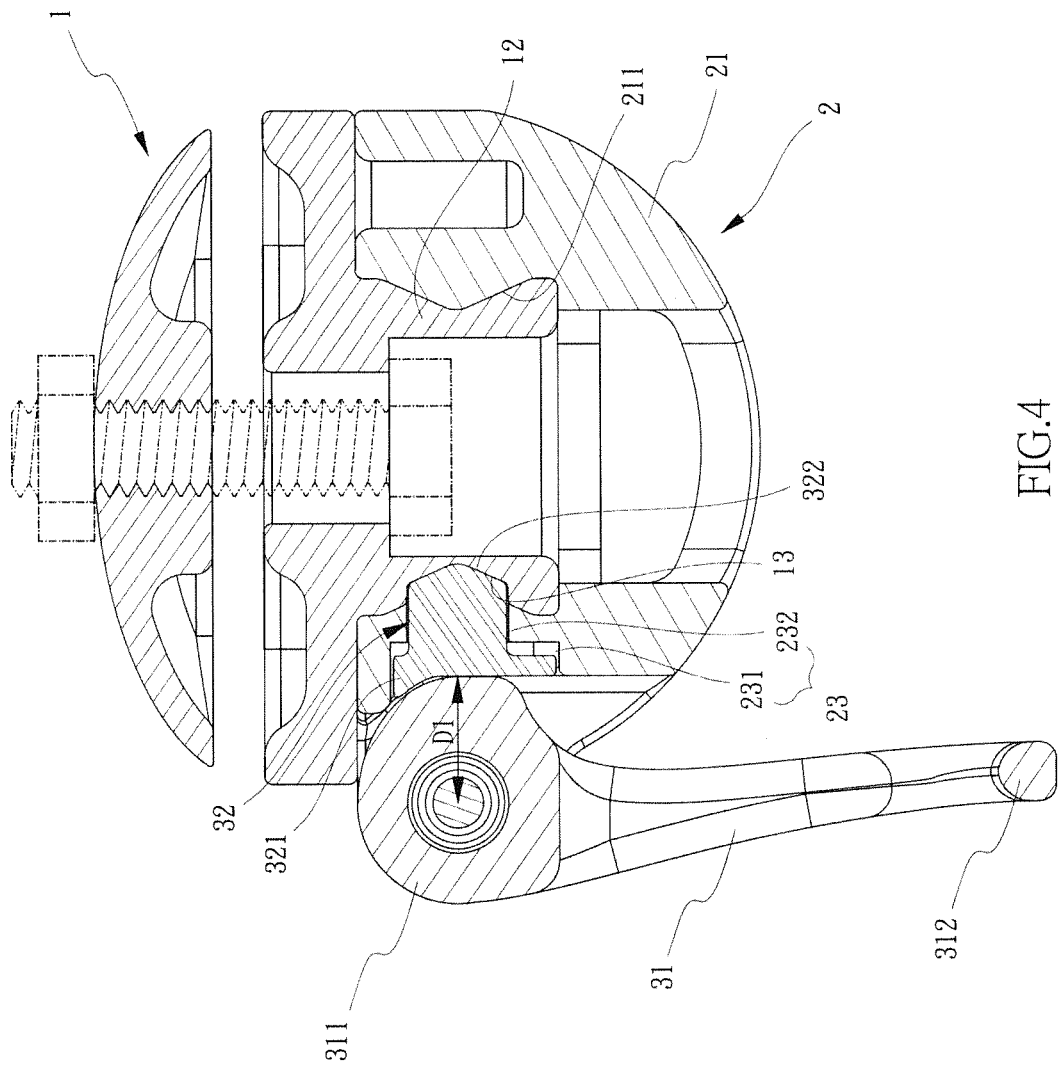
FIG. 4 is a cross-sectional view of the quick release attachment for a bicycle along line IV-IV of FIG. 3.

Referring to FIGS. 1-4, a quick release attachment for a bicycle in accordance with the present invention comprises an attachment device 1 and a bracket 2. The attachment device 1 has a main connecting body 12 defined at a lower portion thereof. The main connecting body 12 has a retaining groove 13 defined at one lateral sided thereof, as shown in FIG. 4. The bracket 2 is assembled on a bicycle. The bracket 2 has a sub connecting body 21 corresponding to the main connecting body 12. As shown in FIGS. 2-3, the main connecting body 12 of the attachment device 1 is detachable from the sub connecting body 21 of the bracket 2. The sub connecting body 21 has a positioning groove 211 defined therein and corresponding to the main connecting body 12. The main connecting body 12 is shaped as a rail. The main connecting body 12 is slid into the positioning groove 211 of the sub connecting body 21 and positioned in the positioning groove 211. Therefore, the attachment device 1 is connected to the bracket 2 via the main connecting body 12. Besides, the attachment device 1 is only slidable relative to the positioning groove 211 horizontally so as to restrict vertical motion of the attachment device 1.

Figure 5:
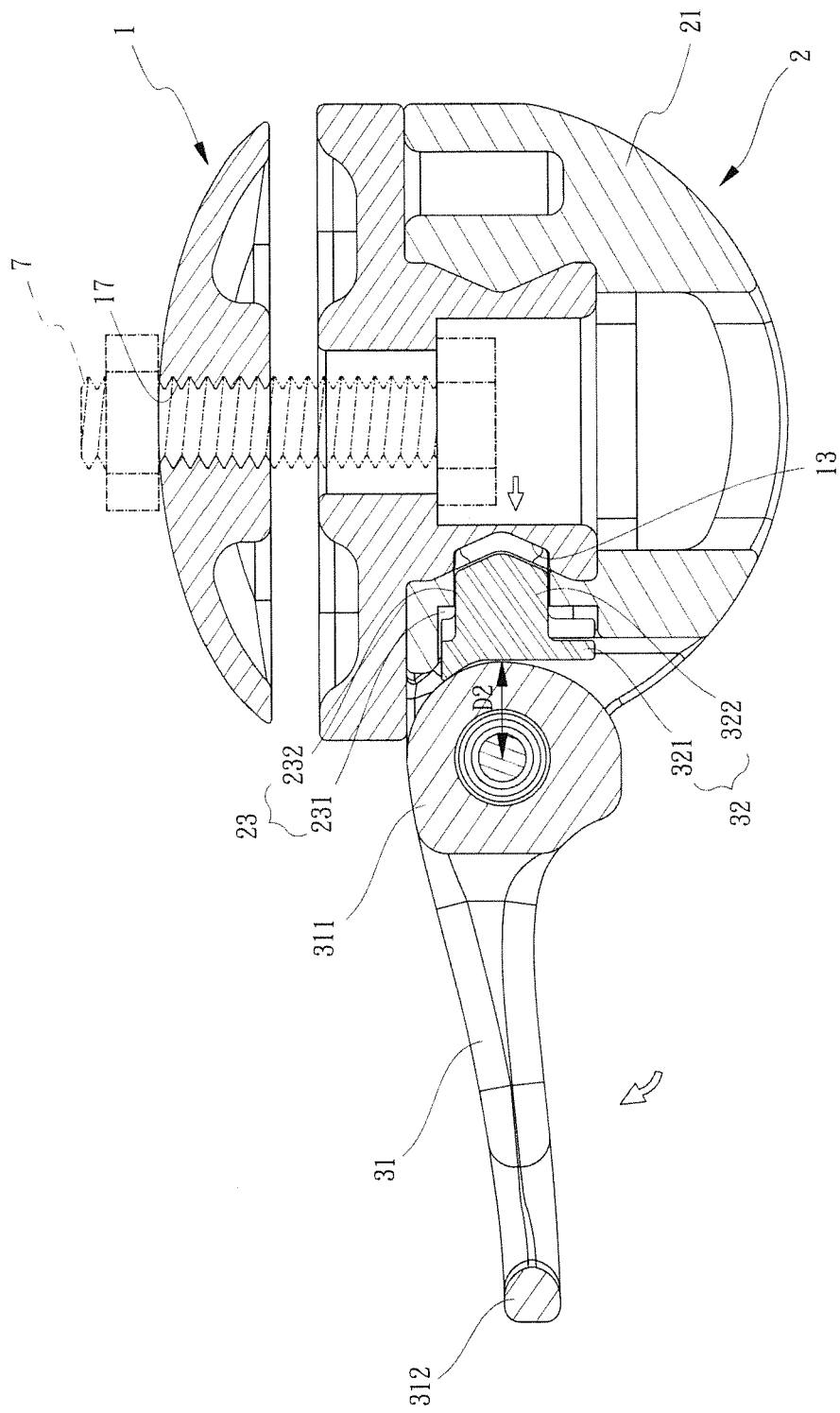
FIG. 5 illustrates that a lever arm is released of FIG. 4.

The bracket 2 has a connecting portion 22 defined at one lateral side thereof which corresponds to the retaining groove 13 of the main connecting body 12. The connecting portion 22 of the bracket 2 has an opening 23 defined therethrough and communicating with the retaining groove 13 of the main connecting body 12. Furthermore, a quick release assembly 3 is assembled to the bracket 2, as shown in FIGS. 1-3. The quick release assembly 3 has a quick release member 31 and an abutting block 32. The quick release member 31 has a pivot portion 311 defined at one end thereof and a grip portion 312 defined at another end thereof. The pivot portion 311 is assembled with the connecting portion 22 of the bracket 2 pivotally. The abutting block 32 is movably received in the opening 23 of the bracket 2. The abutting block 32 has a first abutting end 321 and a second abutting end 322 defined at two ends thereof respectively. The first abutting end 321 abuts against the pivot portion 311 of the quick release member 31. The second abutting end 322 is inserted into the opening 23 of the bracket 2. The pivot portion 311 of the quick release member 31 has a pivot hole 313 defined therethrough and defines an axis X as a central axis of the pivot hole 313. The pivot portion 311 defines a tightening position and a releasing position so that the pivot portion 311 of the quick release member 31 is pivoted relative to the connecting portion 22 of the bracket 2 between the tightening position and the releasing position. As shown in FIG. 4, when the pivot portion 311 is on the tightening is position, a distance D1 is defined between the axis X and a contact surface defined between the pivot portion 311 of the quick release member 31 and the first abutting end 321 of the abutting block 32. As shown in FIG. 5, when the pivot portion 311 is on the releasing position, a distance D2 is defined between the axis X and the contact surface between the pivot portion 311 and the first abutting end 321. Wherein, the distance D1 is larger than the distance D2.

Referring to FIGS. 4-5, the operation to attach the attachment device 1 to the bracket 2 is described below. Firstly, the main connecting body 12 of the attachment device 1 is slid into the sub connecting body 21 of the bracket 2. After that, the quick release member 31 is pivoted downwardly relative to the connecting portion 22 to the tightening position (as shown in FIG. 4), so that the pivot portion 311 presses the first abutting end 321 of the abutting block 32 so as to push the second abutting end 322 of the abutting block 32 into the retaining groove 13. Therefore, the attachment device 1 is secured to the bracket 2 via the abutting block 32. In contrast, when the quick release member 31 is pivoted upwardly relative to the connecting portion 22 to the releasing position (as shown in FIG. 5), the abutting block 32 is uncompressed by the pivot portion 311, so that the abutting block 32 is withdrawn from the retaining groove 13 of the main connecting body 12. Therefore, the attachment device could be detached from the bracket 2.

Under this arrangement, it is convenient for a user to quickly and smoothly assemble or disassemble the attachment device 1 to the bracket 2 by pulling the grip portion 312 of the quick release member 31 to the tightening position or the releasing position. In a preferred embodiment, a saddle 4 is mounted on the attachment device 1 so that the user could detach the attachment device 1 from the bracket 2 to exchange different saddles on the bicycle easily.

Referring to FIG. 1 the connecting portion 22 of the bracket 2 further has two convex ears 24, 25. The two convex ears 24, 25 are spaced a distance apart at the lateral side of the bracket 2. The two convex ears 24, 25 have two through holes 241, 251 defined therethrough respectively. The opening 23 is disposed between the two convex ears 24, 25 of the connecting portion 22. The pivot portion 311 of the quick release member 31 is assembled between two convex ears 24, 25, and the pivot hole 313 of the quick release member 31 corresponds to the two through holes 241, 251.

Figure 6:
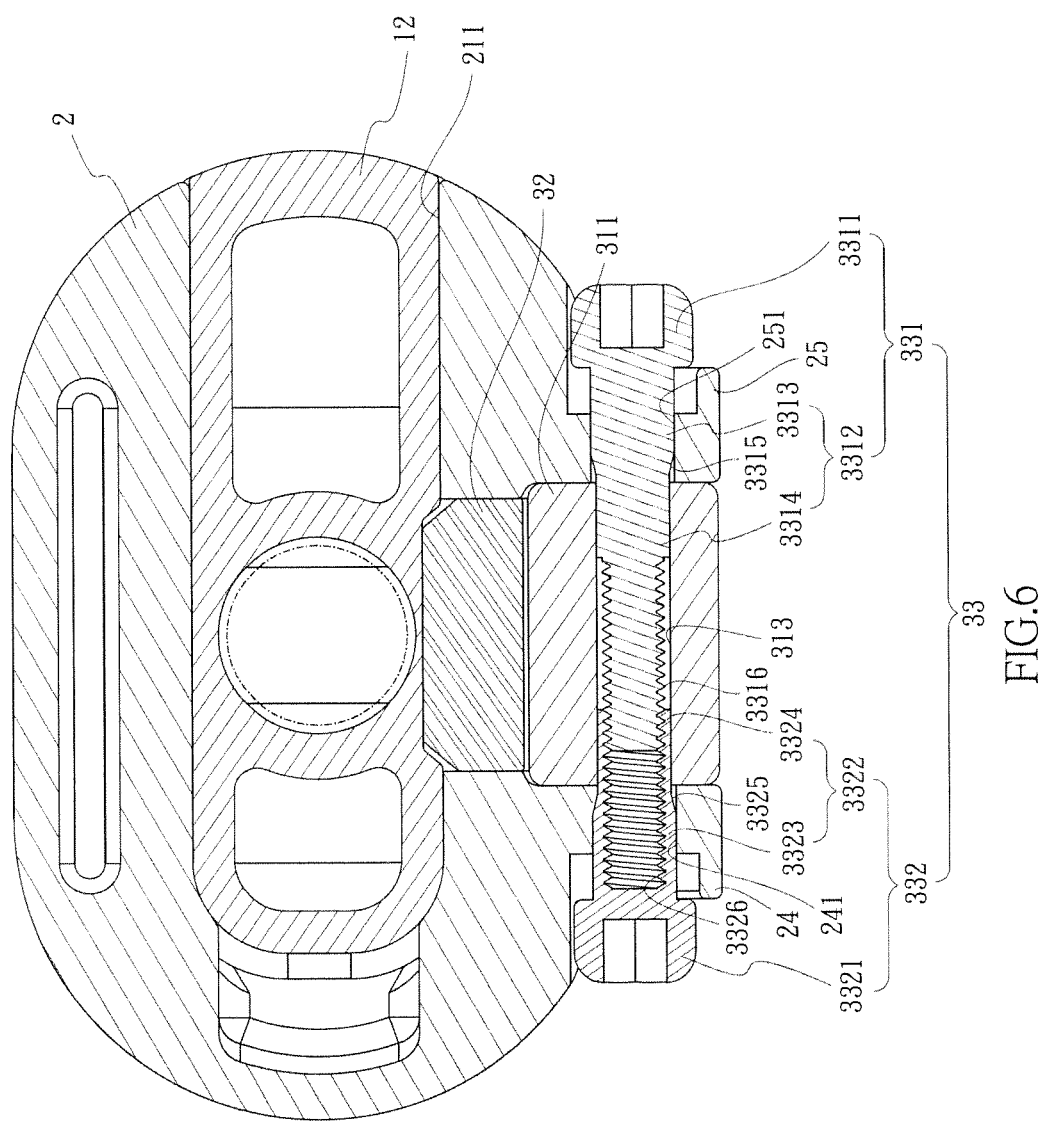
FIGS. 6-8 are cross-sectional views of the quick release attachment for a bicycle along line VI-VI of FIG. 3 showing the adjustment of an adjustment assembly.
Figure 7:
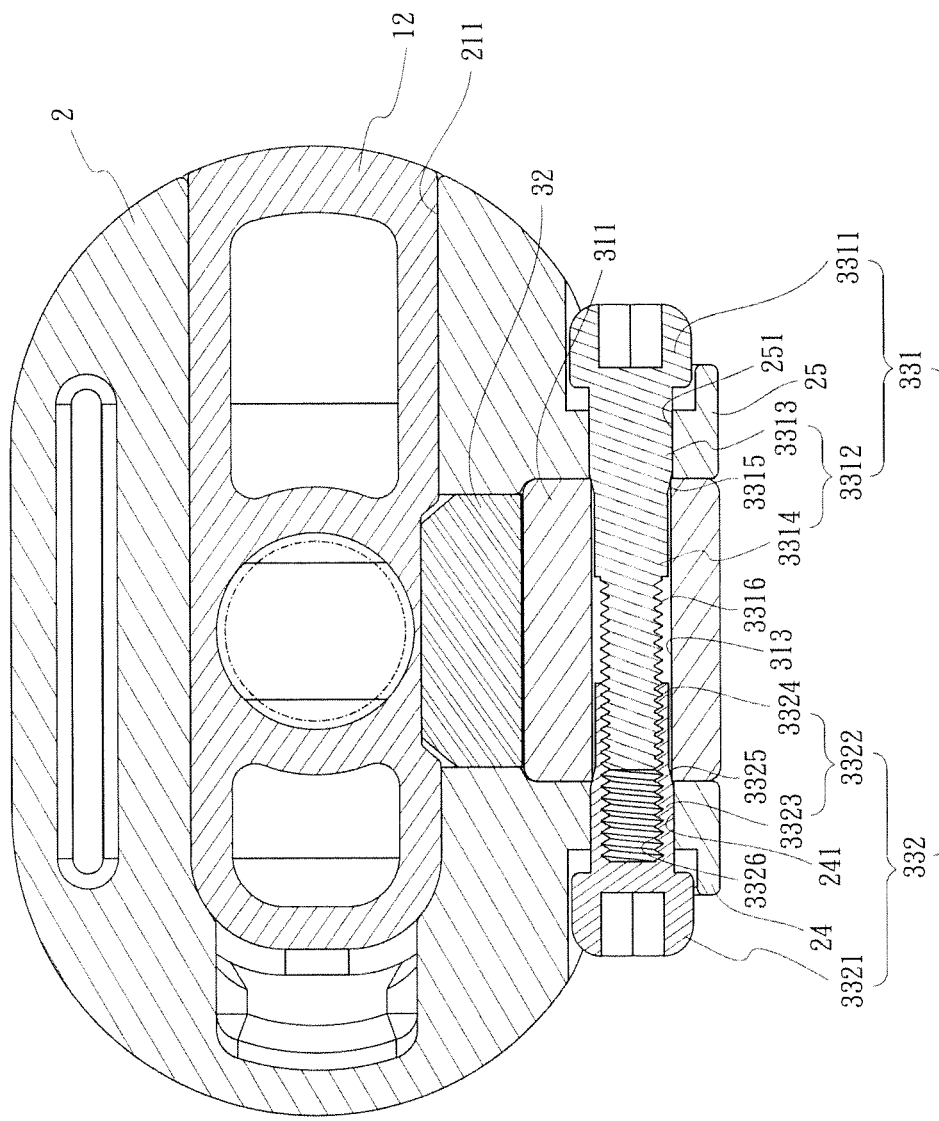
Figure 8:
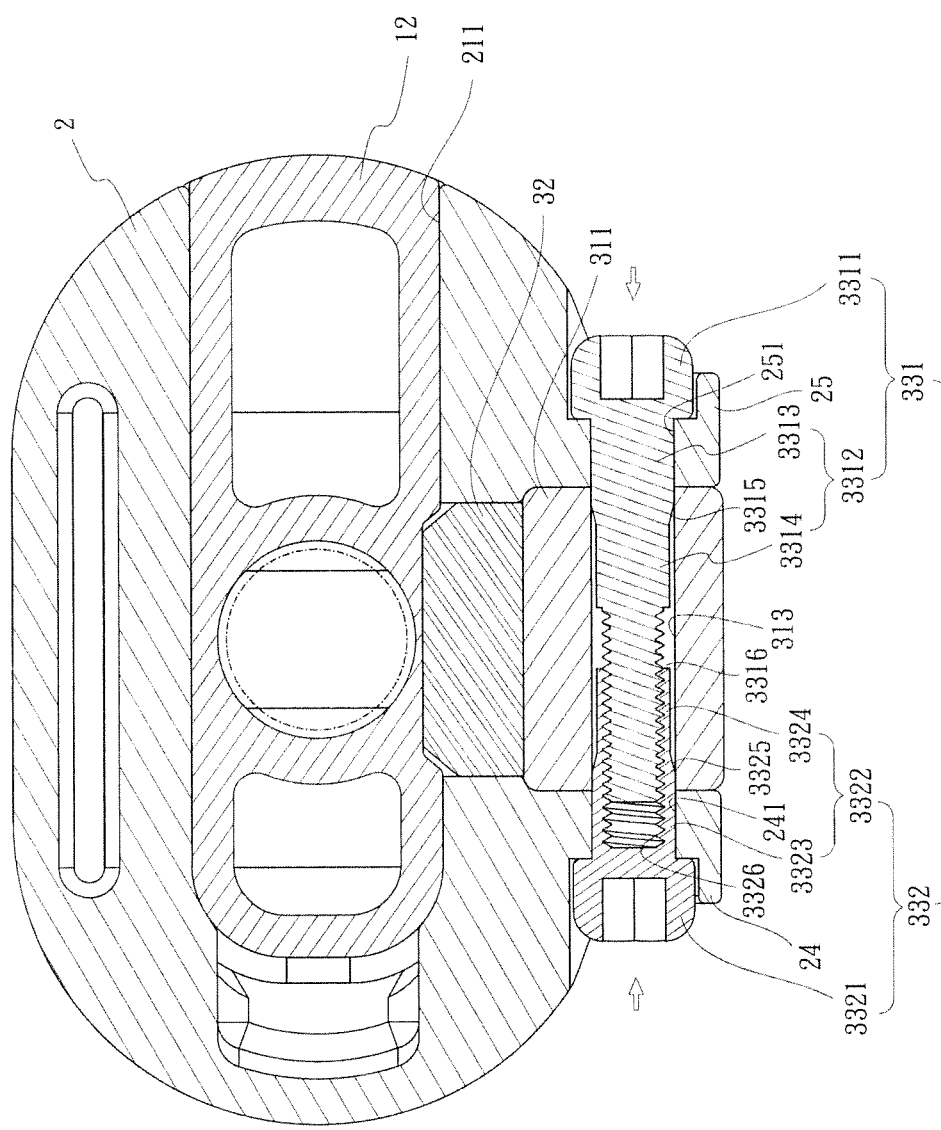

Referring to FIGS. 6-8, the quick release assembly 3 further has an adjusting assembly 33. The adjusting assembly 33 has a first adjusting member 331 and a second adjusting member 332. The first adjusting member 331 has a first head 3311 and a first shank 3312. The second adjusting member 332 has a second head 3321 and a second shank 3322. The first shank 3312 and the second shank 3322 both have an enlarging section 3313, 3323 and a narrow section 3314, 3324. The enlarging section 3313 of the first shank 3312 is adjacent to the first head 3311, and the narrow section 3314 of the first shank 3312 is adjacent to the enlarging section 3313 so that the enlarging section 3313 is disposed between the narrow section 3314 and the first head 3311. The enlarging section 3323 of the second shank 3322 is adjacent to the second head 3321, and the narrow section 3324 of the second shank 3322 is adjacent to the enlarging section 3323 so that the enlarging section 3323 is disposed between the narrow section 3324 and the second head 3321. The first shank 3312 of the first adjusting member 331 and the second shank 3322 of the second adjusting member 332 respectively pass through the two through holes 241, 251 of the two convex ears 24, 25 and are inserted into the pivot hole 313 of the quick release member 31. The first adjusting member 331 and the second adjusting member 332 are coupled with each other, wherein the narrow sections 3314, 3324 are disposed in the pivot hole 313 of the quick release member 31 and the enlarging sections 3313, 3323 are disposed out of the pivot hole 313.

The diameters of the narrow sections 3314, 3324 of the first adjusting member 331 and the second adjusting member 332 are equal to the diameter of the pivot hole 313 of the quick release member 31. The diameters of the enlarging sections 3313, 3323 of the first adjusting member 331 and the second adjusting member 332 are larger than the diameter of the pivot hole 313 of the quick release member 31. Therefore, when the first adjusting member 331 and the second adjusting member 332 are adjusted toward each other, the enlarging sections 3313, 3323 of the first adjusting member 331 and the second adjusting member 332 are configured to compress an inner wall of the pivot hole 313 of the quick release member 31, so that the pivot hole 313 is enlarged by the enlarging sections 3313, 3323 and further presses the pivot portion 311 to abut against the first abutting end 321 of the abutting block 32. Thus, when the pivot portion 311 of the quick release member 31 or the abutting block 32 is abraded to reduce an engaging force of the abutting block 32, the user could adjust the adjusting assembly 33 to recover the engaging force of the abutting block 32 so as to prevent the attachment device 1 from being loosened.

Furthermore, as shown in FIG. 7, the first adjusting member 331 and the second adjusting member 332 both have an inclined surface 3315, 3325 defined between the enlarging section 3313, 3323 and the narrow section 3314, 3324. The inclined surfaces 3315, 3325 of the first adjusting member 331 and the second adjusting member 332 are respectively abutted against two sides of the pivot hole 313, which are provided for the user to precisely adjust the adjusting assembly 33 so as to adjust a proper engaging force of the abutting block 32.

Referring to FIGS. 4-5, the opening 23 of the bracket 2 has a first opening 231 and a second opening 232. The second opening 232 is defined in a bottom of the first opening 231 and communicates with the first opening 231. The first opening 231 is larger than the second opening 232 to form a shoulder (not numbered) between the openings 231, 232. The second abutting end 322 of the abutting block 32 passes through the second opening 232. The first abutting end 321 of the abutting block 32 is received in the first opening 231 and abuts against the shoulder. Therefore, when the abutting block 32 is compressed by the pivot portion 311 of the quick release member 31, the first abutting end 321 of the abutting block 32 is restricted in the first opening 231 so as to prevent the abutting block 32 from being slipped off the second opening 232.

Furthermore, as shown in FIGS. 6-8, the first shank 3312 of the first adjusting member 331 has an external thread section 3316 defined at one end thereof. The second shank 3322 of the second adjusting member 332 has an internal thread section 3326 defined in an inner periphery thereof. The external thread section 3316 of the first adjusting member 331 corresponds to the internal thread section 3326 of the second adjusting member 332. The external thread section 3316 of the first adjusting member 331 is screwed into the internal thread section 3326 of the second adjusting member 332 so as to secure the pivot portion 311 of the quick release member 31 to the connecting portion 22 of the bracket 2. In addition, a distance between the first adjusting member 331 and the second adjusting member 332 is adjusted by means of screw so as to adjust the engaging force of the abutting block 32.

Figure 9:
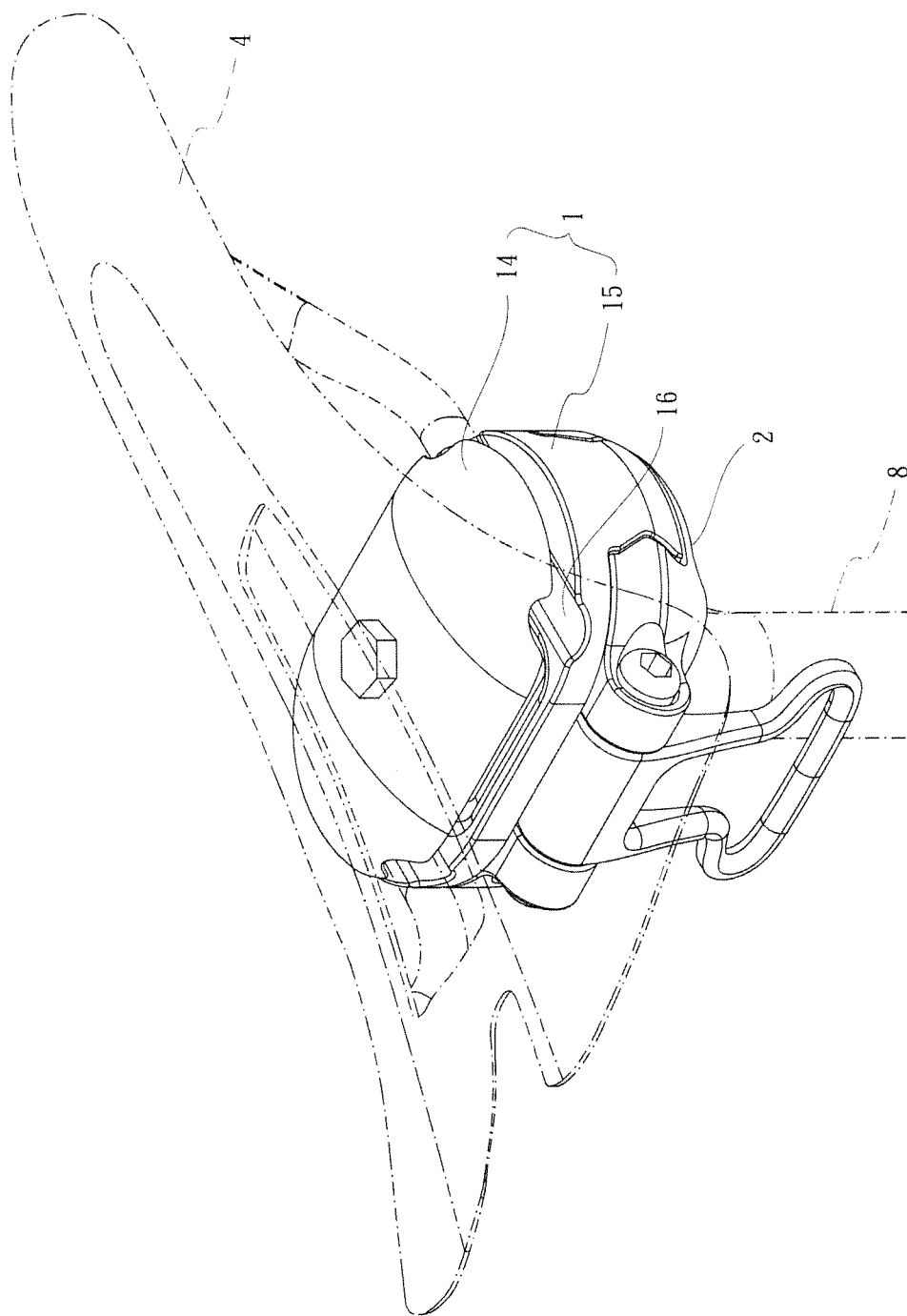
FIG. 9 illustrates that the quick release attachment for a bicycle is assembled with a saddle.
Figure 10:
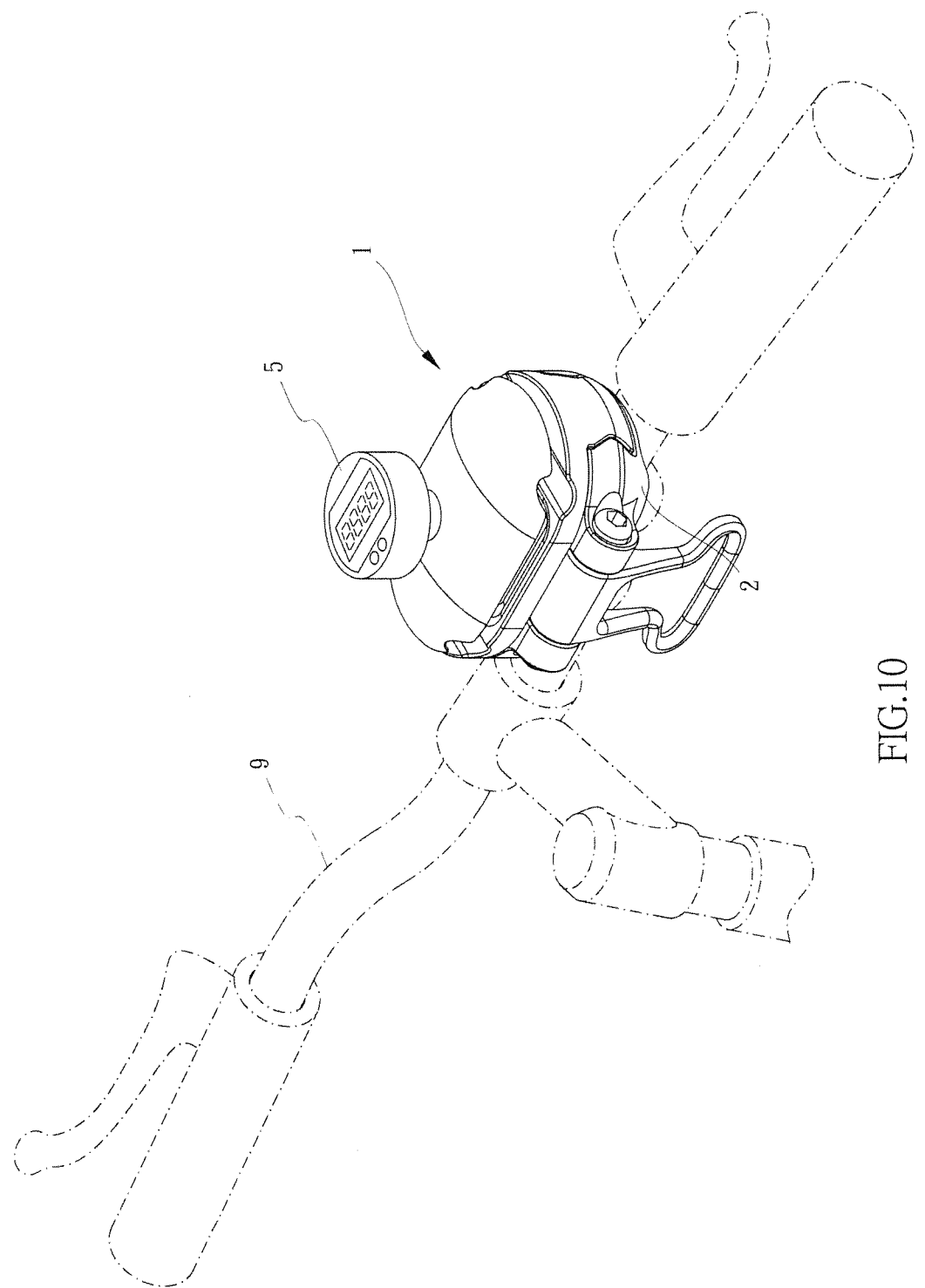
FIG. 10 illustrates that a speedometer is mounted on the quick release attachment for a bicycle.
Figure 11:
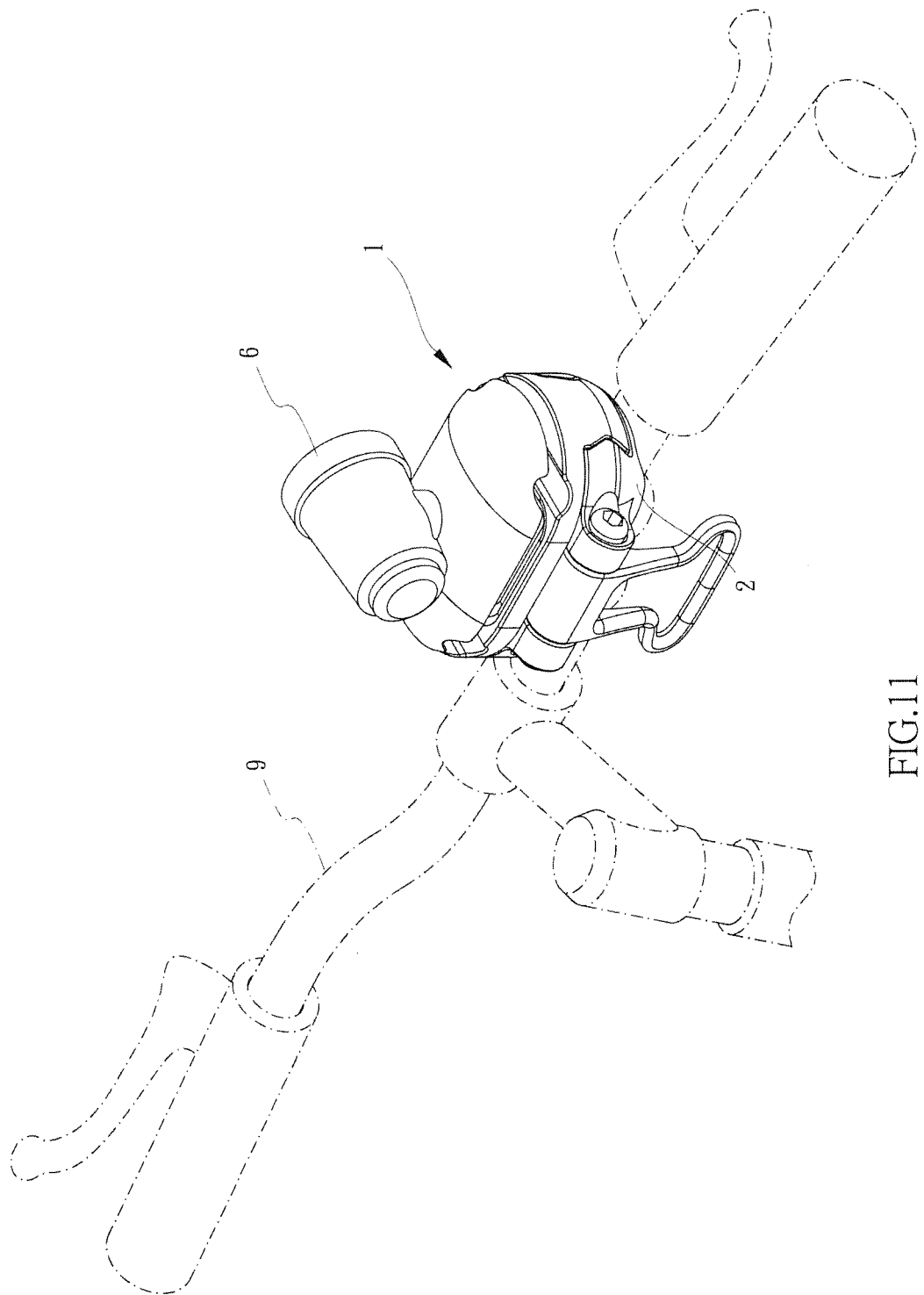
FIG. 11 illustrates that a lamp is mounted on the quick release attachment for a bicycle.

FIGS. 9-11 illustrate different bicycle attachments could be assembled to the attachment device 1, such as saddles, speedometers, or lamps. As shown in FIG. 9, the bracket 2 is mounted on a seat post 8. The attachment device 1 has a cover member 14 and an assembling base 15. The main connecting body 12 is disposed under the assembling base 15 and the cover member 14 is assembled on a top side of the assembling base 15. The assembling base 15 has two clamping grooves 16 defined at the top side thereof. The cover member 14 has another two clamping grooves 16 defined at one side thereof and corresponding to the two clamping grooves 16 of the assembling base 15. The attachment device 1 has a threaded hole 17 defined therethrough. A screw member 7 passes through the threaded hole 17 of the attachment device 1 from the connecting body 12 to the cover member 14 and secured. Two rails of the saddle 4 are positioned in the clamping grooves 16 so that the saddle 4 is clamped by the cover member 14 and the assembling base 15 of the attachment device 1. Referring to FIGS. 10-11, the bracket 2 is secured on a handlebar 9, and the screw member 7 is exposed out of the threaded hole 17 so that a speedometer 5 or a lamp 6 could be assembled on a terminal end of the crew member 7.

Although the invention has been explained in relation to its preferred embodiment, it is to be understood that many other possible modifications and variations can be made without departing from the scope of the invention as hereinafter claimed.

What is claimed is:

1. A quick release attachment for a bicycle comprising:
    an attachment device having a main connecting body defined at a lower portion thereof, the main connecting body having a retaining groove defined at one lateral sided thereof;
    a bracket assembled on a bicycle, the bracket having a sub connecting body corresponding to the main connecting body, the bracket having a connecting portion defined at one lateral side thereof, the connecting portion of the bracket having an opening defined therethrough and communicating with the retaining groove of the main connecting body; and a quick release assembly having a quick release member and an abutting block, the quick release member having a pivot portion and a grip portion, the pivot portion assembled with the connecting portion of the bracket pivotally, the pivot portion defining a tightening position and a releasing position, the pivot portion pivoted between the tightening position and the releasing position via the grip portion, the abutting block received in the opening of the bracket, the abutting block having a first abutting end and a second abutting end defined at two ends thereof respectively, the first abutting end abutting against the pivot portion, the second abutting end inserted into the opening of the bracket, the pivot portion defining an axis at a center thereof;

wherein, when the pivot portion is on the tightening position, a distance between the axis and the first abutting end of the abutting block is larger than another distance between the axis and the first abutting end of the abutting block as the pivot portion is on the releasing position.

2. The quick release attachment for a bicycle as claimed in claim 1, wherein the connecting portion of the bracket further has two convex ears, the two convex ears having two through holes defined therethrough respectively; the opening is disposed between the two convex ears of the connecting portion; the pivot portion of the quick release member is assembled between the two convex ears; the pivot portion of the quick release member has a pivot hole defined therethrough.

3. The quick release attachment for a bicycle as claimed in claim 2, wherein the quick release assembly has an adjusting assembly, the adjusting assembly having a first adjusting member and a second adjusting member, the first adjusting member having a first head and a first shank, the second adjusting member having a second head and a second shank; the first shank and the second shank both have an enlarging section and a narrow section; the enlarging section of the first shank is adjacent to the first head, and the narrow section of the first shank is adjacent to the enlarging section; the enlarging section of the second shank is adjacent to the second head, and the narrow section of the second shank is adjacent to the enlarging section.

4. The quick release attachment for a bicycle as claimed in claim 3, wherein the first adjusting member and the second adjusting member both have an inclined surface defined between the enlarging section and the narrow section; the inclined surfaces of the first adjusting member and the second adjusting member are respectively abutted against two sides of the pivot hole.

5. The quick release attachment for a bicycle as claimed in claim 4, wherein the first shank of the first adjusting member and the second shank of the second adjusting member respectively pass through the two through holes of the two convex ears and are inserted into the pivot hole of the quick release member; the first adjusting member and the second adjusting member are coupled with each other, wherein the narrow sections are disposed in the pivot hole of the quick release member and the enlarging sections are disposed out of the pivot hole; when the first adjusting member and the second adjusting member are adjusted toward each other, the enlarging sections of the first adjusting member and the second adjusting member compress an inner wall of the pivot hole of the quick release member so as to press the pivot portion to abut against the first abutting end of the abutting block.

6. The quick release attachment for a bicycle as claimed in claim 3, wherein the first shank of the first adjusting member has an external thread section defined at one end thereof; the second shank of the second adjusting member has an internal thread section defined in an inner periphery thereof; the external thread section of the first adjusting member corresponds to the internal thread section of the second adjusting member; the external thread section of the first adjusting member is screwed into the internal thread section of the second adjusting member.

7. The quick release attachment for a bicycle as claimed in claim 1, the opening of the bracket has a first opening and a second opening, the second opening defined in a bottom of the first opening and communicating with the first opening; the first opening is larger than the second opening to form a shoulder between the openings; the second abutting end of the abutting block passes through the second opening; the first abutting end of the abutting block is received in the first opening and abuts against the shoulder.

8. The quick release attachment for a bicycle as claimed in claim 1, wherein the sub connecting body has a positioning groove defined therein; the main connecting body is slid into the positioning groove of the sub connecting body and positioned in the positioning groove.

9. The quick release attachment for a bicycle as claimed in claim 1, wherein the attachment device has a cover member and an assembling base; the main connecting body is disposed under the assembling base and the cover member is assembled on a top side of the assembling base; the assembling base has two clamping grooves defined at the top side thereof; the cover member has another two clamping grooves defined at one side thereof and corresponding to the two clamping grooves of the assembling base.

10. The quick release attachment for a bicycle as claimed in claim 1, wherein the attachment device has a threaded hole defined therethrough; a screw member passes through the threaded hole of the attachment device from the connecting body to the cover member and secured; a bicycle attachment is assembled on a terminal end of the crew member.

* * * * *